UNITED STATES PATENT OFFICE.

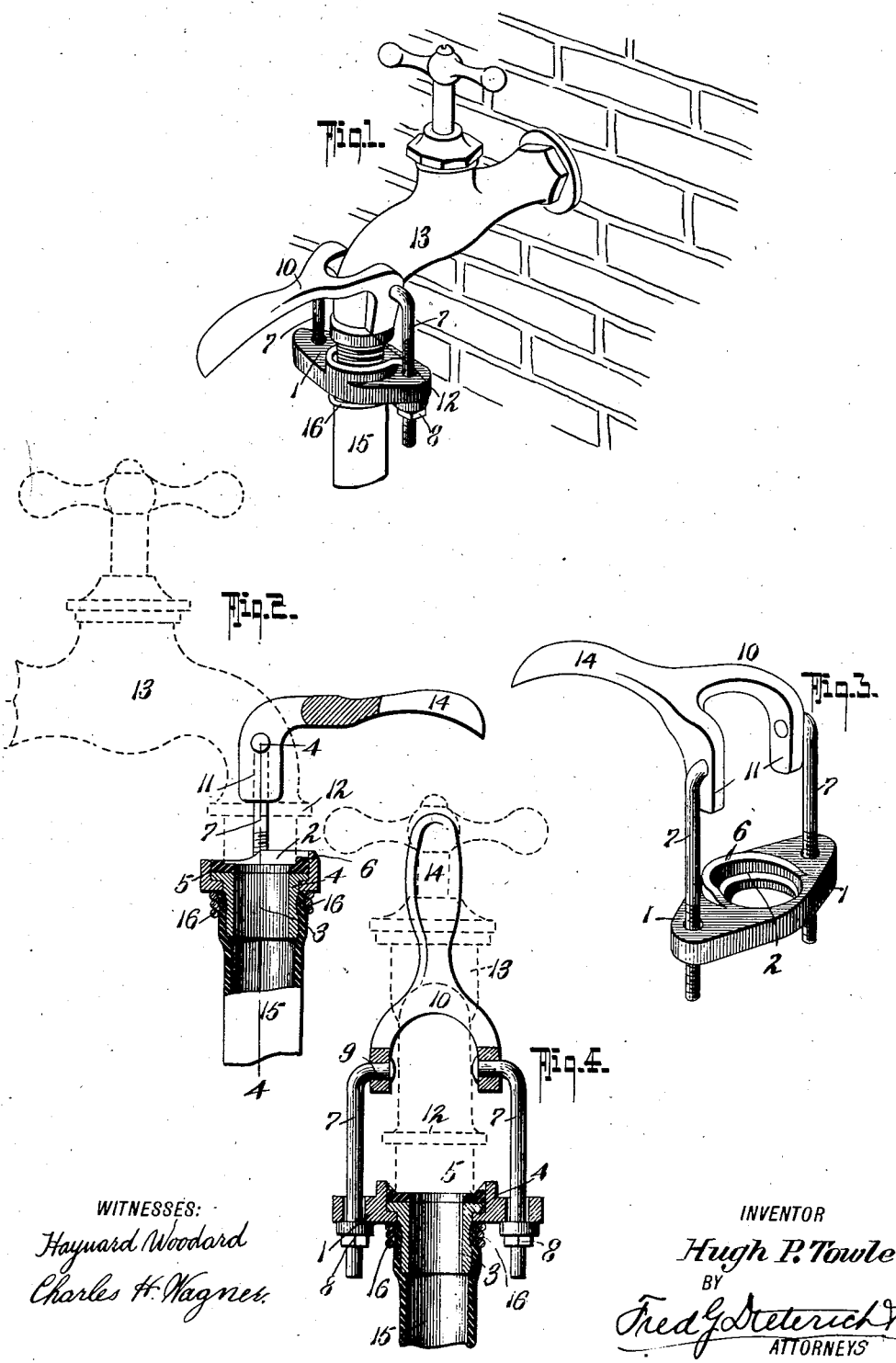

HUGH P. TOWLE, OF SAN JOSE, CALIFORNIA, ASSIGNOR OF FIVE-EIGHTHS TO JOHN H. McGEHEE, OF SAN JOSE, CALIFORNIA.

FAUCET HOSE-COUPLING.

939,932.     Specification of Letters Patent.     Patented Nov. 9, 1909.

Original application filed November 25, 1908, Serial No. 464,496. Divided and this application filed April 13, 1909. Serial No. 489,575.

*To all whom it may concern:*

Be it known that I, HUGH P. TOWLE, residing at San Jose, in the county of Santa Clara and State of California, have invented certain new and useful Improvements in Faucet Hose-Couplings, of which the following is a specification.

My invention has for its object to provide a coupling or connecting means especially adapted for joining a hose with the ordinary form of faucet.

This application is a divisional part of my co-pending application filed November 25, 1908, Serial No. 464,496.

My present invention resides in those novel details of construction, combination and arrangement of parts, all of which will be first described in detail, and then be specifically pointed out in the appended claims, reference being had to the accompanying drawings, in which:

Figure 1, is a perspective view illustrating the application of my invention. Fig. 2, is a vertical section of my invention. Fig. 3, is a perspective view of the clamping member shown in Fig. 1. Fig. 4, is a vertical section of my invention on the line 4—4 of Fig. 2, the handle being shown in its uppermost position.

Referring now to the accompanying drawings in which like numerals of reference indicate like parts in all of the figures, it will be seen that I provide a main plate 1 having an annular socket 2 in its upper face that surrounds the central opening therein, thereby forming a seat to receive the flange head 4, of the tubular coupling head 3, and a cushion or washer 5, see Figs. 2 and 4.

The plate 1, on its upper side has a semicircular, vertical flange 6 that serves as a guide and a stop when the device is being applied to the end of a faucet, as will be clearly understood by reference to Figs. 1, 2 and 4 of the drawings.

Stout rods 7 serve as standards and have their lower ends threaded to receive the nuts 8. The rods 7 project through and have loose play in apertures in the plate 1 and at the upper end the rods 7 are bent over at right angles to form pivot studs 9 for the clamping yoke 10, whose ends 11 lock against the flange 12 of the faucet 13, the yoke 10 having a solid handle extension 14, as shown.

The hose 15 is secured to the nipple or coupling plug 3 by a clamping wire 16 in the usual manner.

Applying my coupling to a faucet the handle 14 is raised as shown in Fig. 4, and the parts slipped into engagement with the faucet, after which the handle 14 is brought down, as shown in Figs. 1 and 2, to cause the cam ends 11 to engage the flange of the faucet, as shown in Figs. 1 and 2, when the parts will be securely coupled together.

From the foregoing description taken in connection with the accompanying drawings, it is thought the complete construction operation and numerous advantages of my invention will be readily understood by those skilled in the art to which the invention appertains.

What I claim is:

1. A hose faucet coupling, comprising a nipple plate, a depressed seat surrounding its central passage, a yielding washer in said seat, standards adjustably mounted on the plate, a yoke pivotally mounted between the standards, the outer ends of which have their edges arranged to clamp against a faucet flange when turned down, thereon.

2. A hose and faucet coupling that comprises a main plate, having a central passage and a depressed annular seat that surrounds the passage, a nipple for fitting through the said passage having an enlarged head to rest in the said seat, a clamp device carried by the main plate for locking the said main plate against the discharge end of the faucet.

3. A hose and faucet coupling that comprises a main plate having a central passage and a nipple pendent from the passage, a semicircular vertical flange on the upper face of the plate adjacent to the passage, and clamping devices mounted on the plate for clamping the said plate against the discharge end of the faucet.

4. A hose and faucet coupling that comprises a main plate having a central passage and a nipple pendent from the passage, a semicircular vertical flange on the upper face of the plate adjacent to the passage, and adjustable clamping devices mounted on the plate for clamping the said plate against the discharge end of the faucet.

HUGH P. TOWLE.

Witnesses:
 CHAS. F. W. HERRMANN,
 D. D. TENNYSON.